(12) United States Patent
Ryneš et al.

(10) Patent No.: US 7,234,482 B2
(45) Date of Patent: Jun. 26, 2007

(54) SERVOVALVE WITH TORQUE MOTOR

(75) Inventors: Vladimír Ryneš, Velešín (CZ); Tomáš Hrachovský, Strážnice (CZ)

(73) Assignee: Jihostroj a.s., Velesin (CZ)

( * ) Notice: Subject to any disclaimer, the term of this patent is extended or adjusted under 35 U.S.C. 154(b) by 157 days.

(21) Appl. No.: 11/084,754

(22) Filed: Mar. 21, 2005

(65) Prior Publication Data
US 2005/0205130 A1 Sep. 22, 2005

(30) Foreign Application Priority Data
Mar. 22, 2004 (CZ) .................. 2004-402

(51) Int. Cl.
*F16K 31/02* (2006.01)
*H01F 7/08* (2006.01)
*G05D 16/20* (2006.01)

(52) U.S. Cl. ............... 137/82; 251/65; 251/129.18; 335/230; 335/238

(58) Field of Classification Search ........... 137/82–86; 251/65, 129.18; 335/229, 230, 276, 238, 335/258
See application file for complete search history.

(56) References Cited

U.S. PATENT DOCUMENTS

| 3,223,104 A | * | 12/1965 | Cox et al. ............... 137/85 |
| 3,323,090 A | * | 5/1967 | O'Brien ................ 335/230 |
| 3,533,032 A | | 10/1970 | Schindel et al. |
| 3,587,016 A | * | 6/1971 | Coakley ............... 335/237 |
| 5,024,247 A | * | 6/1991 | Lembke ............... 137/82 |
| 5,146,126 A | * | 9/1992 | Hutchins ............. 310/156.38 |
| 5,473,298 A | * | 12/1995 | Teutsch ............... 335/237 |

OTHER PUBLICATIONS

Jihostroj a.s., Jun. 1987, Serv-Valve With an Elastic Thin-Walled Tube, 2 pages.
Jihostroj a.s., Mar. 1989, Serv-Valve With an Elastic Planchet and an O-Ring.
Jihostroj a.s., Sep. 1994, Textron Model 25A.

* cited by examiner

*Primary Examiner*—Ramesh Krishnamurthy
(74) *Attorney, Agent, or Firm*—Jacobson Holman PLLC

(57) ABSTRACT

The servovalve with torque motor consists of a cylindrical case (3) in which an armature (1) is arranged on one end of an arm (16) and a orifice (18) closing a nozzle (19) with working liquid (2) on the other side of the arm (16). The arm (16) is free to rotate round the pivot point of a flexible suspension (15) with a hole (21) of diameter corresponding to the maximum deflection of the arm (16). There are two magnetic pole shoes (5) and two electric pole shoes (4) located around the armature (1), equipped with sealing rings (6), and so the working liquid (2) filling the inside of the case (3) and surrounding the arm (16) and the armature (1) does not leak out of the inside space. Coils (7) are located outside the case (3). The pole shoes (4, 5) are equipped with threaded parts (12), fitting either into the outer ring (10) or the body (3). The magnetic pole shoes (5) are equipped with a non-magnetic protective housing (9). The servovalve solution minimizes flow of the working liquid (2) through the electromagnetic circuit area, separates this area from the working liquid (2) and facilitates adjustment of the torque motor characteristics. The servo valve is suitable for high pressures.

4 Claims, 2 Drawing Sheets

SERVOVALVE WITH TORQUE MOTOR

BACKGROUND AND SUMMARY OF THE INVENTION

The invention deals with a servovalve with a torque motor with mechanical characteristic adjustment, particularly suitable for high pressure levels. The torque motor consists of a square or rectangle cross-section armature surrounded by four pole shoes, two of which are pole shoes with permanent magnets of high energy density located against each other, and the other two are electric pole shoes with exciting coils, also facing each other, but positioned by 90° to the magnetic ones. All the pole shoes are located on the other side than the armature in an outer ring thread, which thus closes the magnetic field. The existing solutions of torque motors of servovalves have to deal with two basic problems, namely separation of working liquid from the servovalve electromagnetic circuit, and then adjustment of the torque motor electromagnetic circuit.

Separation of the liquid area from the electromagnetic circuit of the servovalve is usually solved by sealing integrated in the torque motor armature attachment. There are two solutions. In the first one the attachment consists of a flexible thin-walled tube, the wall of which separates the work medium space from the electromagnetic part of the torque motor. In the other one the attachment consists of a thin flexible sheet, while a static sealing (an O-ring) is installed in the armature rotation axe, and the armature goes through the sealing. However these solutions are not suitable for higher pressure levels of several MPa.

Another solution with the magnetic circuit inundated in the work medium has to be used for high pressures. Actually it is necessary to use specially impregnated coils and to seal wires going through the case of the product.

Adjustment of torque motors is necessary for achieving the required armature stroke characteristic in relation to the controlling signal, mostly electric current. For manufacturing purposes each product has to be finely adjusted to the required characteristics, which have to be quite precise. The existing solutions usually change the electromagnetic power by changing magnetization of the permanent magnets in the electric circuit. This solution requires use of magnets, which can be magnetized and demagnetized. However these magnets are always bigger and heavier than those made of rare soils, which are magnetized from manufacturing and have high energy density relative to a volume unit. In some instances the torque motor characteristic pattern has to be modified, which can only be achieved by different distance between the armature and the pole shoes, which however requires to dismantle the torque motor, insert inlets or grind off the pole shoes.

The above reasons call for providing a solution of a torque motor that could cope with work medium pressures of up to several MPa with no impact on the operation or life cycle of the servovalve components.

It is then necessary to find a torque motor design enabling adjustment of torque motor characteristics without having to dismantle it, modify its parts or magnetize the permanent magnets.

Finally we should find such a solution of torque motor that uses permanent magnets of rare soils which have high energy density, which can reduce dimensions and weight of the motor.

The primary task of the invention is thus to develop a servovalve with electromagnetic torque motor mentioned in the introductory section, where the new solution separates the work liquid area from the servovalve electromagnetic circuit and facilitates adjustment of the servovalve. The next task of the invention is to minimize the work liquid flow in the area of the electromagnetic circuit. The first task is solved by a solution consisting except others of the above mentioned magnetic pole shoes, an outer ring, a coil and an armature. The servovalve with torque motor consists of the known cylindrical case, in which the armature is situated on one end of an arm, and the orifice closing the nozzle on the other end of the arm, while the arm is free to rotate around a pivot point of a flexible suspension, and there are two magnetic pole shoes and two electric pole shoes with coils positioned by 90° against the first ones, around the armature inside the cylindrical case. The invention principle is based on the fact that the arm with the armature are surrounded by the working liquid, which fills in the inside of the cylindrical case, the pole shoes are fitted with sealing rings on their ends protruding inside the cylindrical case, and the coils are placed outside the case, i.e. outside the area filled in with the working liquid.

In one advantageous modification of the pole shoes attachment the pole shoes are equipped with a threaded part with male thread on their ends oriented from the armature, fitting to the female thread of the outer ring fitted on the cylindrical case.

In another advantageous modification of the pole shoes attachment the pole shoes are equipped with a threaded part with male thread on their ends oriented from the armature, passing through the outer ring and fitting to the female thread cut in the cylindrical case.

In another advantageous modification of the invention the pole shoes are equipped with an axial housing made of non-magnetic material.

The main advantage of the solution of an electromagnetic servovalve with a torque motor according to the invention is, that it enables the servovalve to operate in operation pressures of up to tens of MPa, while the working liquid is separated from the coils and adjustment points of the torque motor.

Another advantage of the solution of an electromagnetic servovalve with a torque motor according to the invention is, that the servovalve characteristics may be simply adjusted by turning the individual pole shoes and thus changing their distance from the armature.

Another advantage of the solution according to the invention is the possibility to use permanent magnets with high energy density, and these magnets do not have to be re-magnetized during adjustment.

The second task of the invention, namely restriction of working liquid flow through the electromagnetic circuit area is solved by the advantageous servovalve solution according to the invention, where the diameter of the hole in the flexible suspension through which the armature arm goes is not bigger than necessary for enabling the required deflection of the armature arm.

The advantage of this servovalve solution is in limitation of the working liquid flow near the armature and the pole shoes to the minimum, which prevents possible impacts on the electromagnetic field and accumulation of magnetic impurity near the armature and the pole shoes.

BRIEF DESCRIPTION OF THE DRAWINGS

The invention will be more closely illustrated by means of drawings, showing.

DETAILED DESCRIPTION OF THE PREFERRED EMBODIMENTS

It is obvious that the below described and depicted particular examples of the invention modifications are illustrative and do not limit the variations of the invention to the presented examples. Experts sussed in the field of technology may find or will be able to find a number of equivalents to the specific invention modifications described here just by routine experimentation. These equivalents will also be included in the extent of the below patent claims.

Let us clarify the following terminology before describing the invention and the related solution. The term "magnetic" material will mean material including paramagnetic and ferromagnetic components with positive susceptibility in the following. "Diamagnetic" material means material with negative susceptibility and relative permeability <1. Stroke characteristic of a torque motor means relationship of the armature stroke as a function of the controlling current passing through the electric coils for constant adjustment of the pole shoes position and constant rigidity of the flexible armature suspension.

Figure 1:
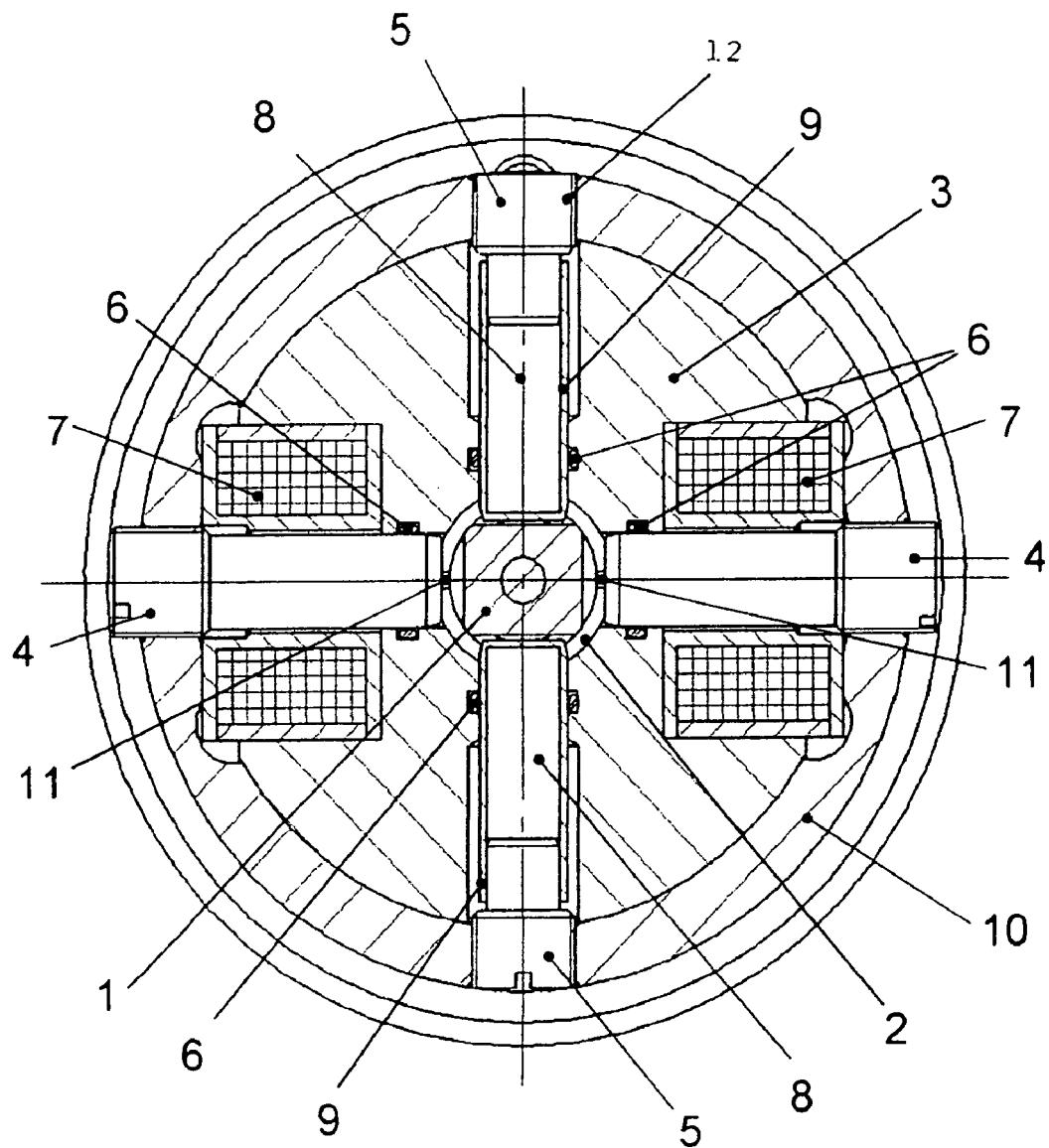
FIG. 1. schematic horizontal cross section through the magnetic circuit of the servovalve torque motor, FIG. 2 schematic vertical cross section of the servovalve with the torque motor according to the invention leading in the plane of the electric pole shoes, FIG. 3 vertical cross section of the servovalve with the torque motor according to the invention leading in the plane of the magnetic pole shoes.
Figure 3:
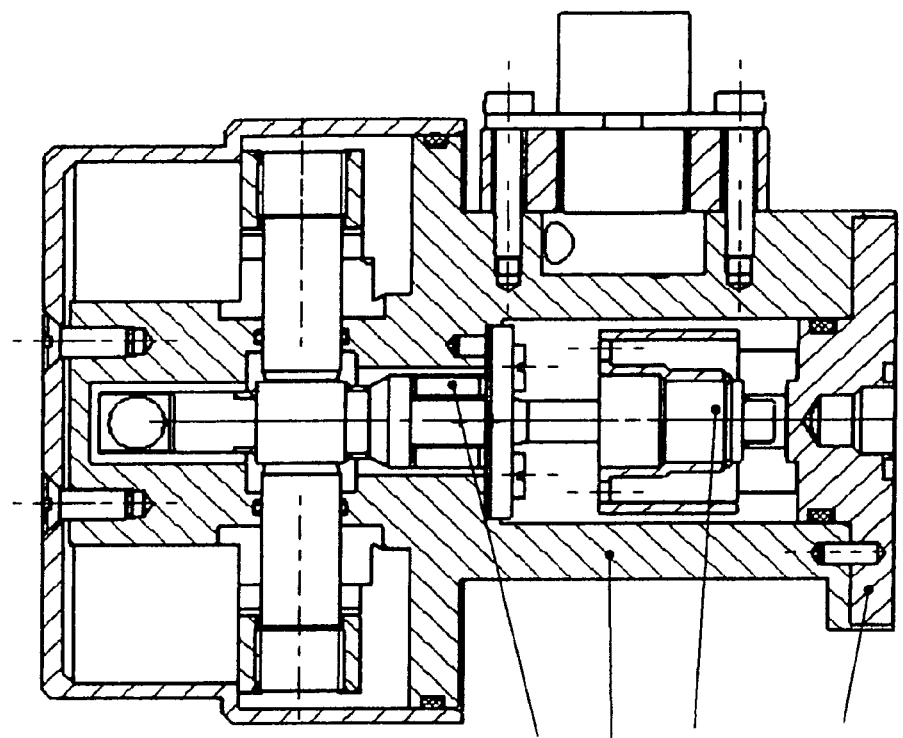

FIG. 1 shows a scheme of the torque motor magnetic circuit, where an armature 1 is located in the working liquid 2 area. There are magnetic pole shoes 5 and electric pole shoes 4 located in the case 3. All the shoes 4, 5 go through sealing rings 6, which prevent the working liquid 2 from leaking out of the working area. Each of the pole shoes 4, 5 has a threaded part 12 on its outer end, which is screwed in internal thread of the outer ring 10 fitted on the case 3. In another modification not depicted here the threaded part 12 may go through the outer ring 10 and fit into internal thread cut directly in the cylindrical case 3.

By turning any of the pole shoes 4, 5 round its longitudinal axe it moves in the thread and the distance between the pole shoe 4, 5 and the armature 1 changes. Each of the magnetic pole shoes 5 has a permanent magnet 8 fitted on the end facing the armature 1. The magnet 8 can be covered under a thin housing 9 made of non-magnetic material, which protects it against external influences or mechanical damage. The magnets 8 are positioned so as the north or the south magnetic poles are on the outer ends of the shoes 5, while both the magnetic pole shoes have to have the same polarization. The magnetic shoes 5 create permanent magnetic field in the magnetic circuit. There are coils 7 with winding fitted on the electric pole shoes 4, which create variable magnetic field. Both the fields are closed via the outer ring 10. Their composition then forms resultant magnetic field with force applied to the armature 1. Required direction of application of the magnetic force on the armature 1 may be achieved by polarization of the magnets 8 and the coils 7. The intensity of the force is directly proportional to the number of ampere-turns on the coils 7. The force may however be modified for given number of ampere-turns by the distance of the pole shoes 4, 5 from the armature 1.

The bigger the distance of the magnetic pole shoes 5 from the armature 1 is, the lower the force applied on the armature 1 will be, and vice versa. This enables the inclination of the stroke characteristic of the torque motor to be adjusted for a given stroke course.

If the electric pole shoes 4 are moved away from the armature 1, the force applied on the armature 1 will also decrease. The linearity of the torque motor stroke characteristic will however also vary.

There are stops 11 attached to the pole shoe 4 faces in the gaps between the shoes 4 and the armature 1. The stops 11 define the minimum possible distance between the shoes 4 and the armature 1. Their size must at least prevent the armature 1 to get stuck to the shoes 4.

Figure 2:
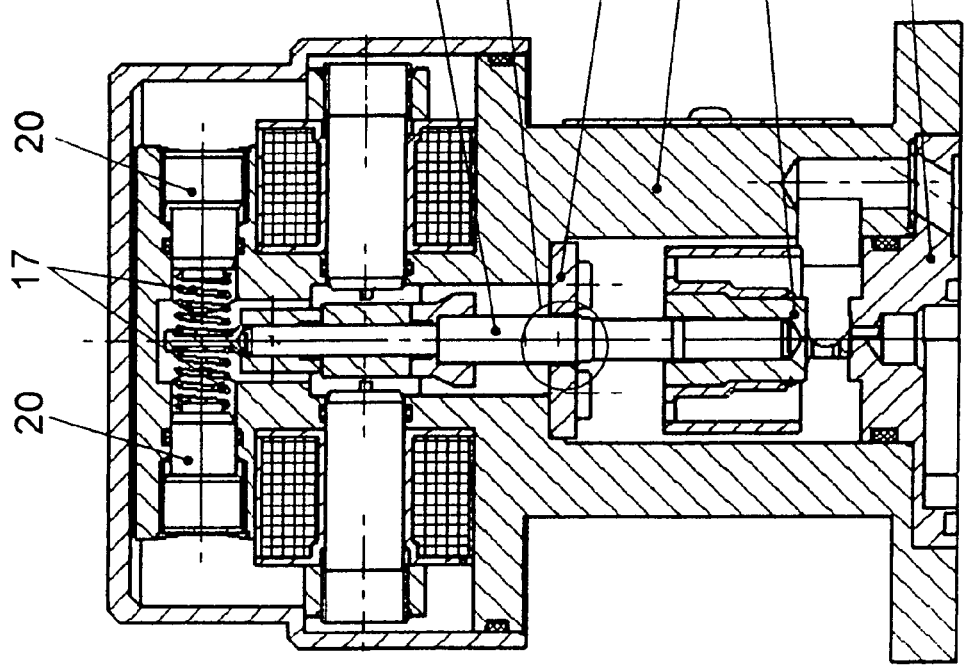

FIG. 2 shows a cross section of a servovalve, which serves in this modification for stepless regulation of the working liquid 2 flow. This one stage servovalve is a one-way type and consists of a case 3, armature 1 suspension 15, an armature 1 arm 16, the above described magnetic circuit, adjustment springs 17, orifice 18 and nozzle 19. The armature 1 arm 16 is located in the flexible armature 1 suspension 15, which enables its slight deflection in the hole 21 round the axe parallel with the magnetic pole shoes 5. This results in movement of the arm 16 end, on which the torque motor armature 1 is attached between the pole shoes 4. On the other side of the armature 1 arm 16 there is the orifice 18 attached, which opens or closes the hole in the nozzle 19 as it moves. The adjustment bolts 20 and the adjustment springs 17 leaning against the armature 1 arm 16 enable the start-up position of the armature 1 to be adjusted with zero current. Change of rigidity of the springs 17 also enables the overall rigidity of the armature 1 to be modified, which influences the torque motor stroke characteristic.

The servovalve with a torque motor according to the invention is applicable in hydraulic circuits and everywhere, where working liquid flow is to be remotely controlled and steplessly regulated. It is particularly suitable for hydraulic circuits operating under high pressure.

The invention claimed is:

1. A servovalve with a torque motor consisting of a cylindrical case, in which an armature is arranged on one end of an arm and an orifice closing a nozzle on the other end of the arm, while the arm is free to rotate in a central part between the arm and the orifice around a pivot point of a flexible suspension, and there are two magnetic pole shoes opposite to each other and two electric pole shoes with coils, turned by 90° from the magnetic pole shoes, both the magnetic pole shoes and the electric pole shoes are located in the cylindrical case around the armature, whereas distal ends of the magnetic pole shoes and the electric shoes that are farther from the armature are connected by an outer ring, wherein the arm including the armature is surrounded by working liquid, which fills inside space of the cylindrical case, the magnetic and electric pole shoes are equipped with sealing rings on their ends extending inside the cylindrical case, and the coils are located on a part of the electric pole shoes extending outside of the inside space of the cylindrical case that is filled with the working liquid.

2. The servovalve with a torque motor according to claim 1, wherein the flexible suspension is provided with a hole, through which the arm extends, and the hole has its diameter limiting the maximum deflection of the arm.

3. The servovalve with a torque motor according to claim 1, wherein the magnetic pole shoes and the electric pole shoes are fitted on ends farther from the armature with threaded parts with male thread fitting into inner thread in the outer ring fitted on the cylindrical case.

4. The servovalve with a torque motor according to claim 1, wherein the magnetic pole shoes are equipped with axial housing made of non-magnetic material.

* * * * *